United States Patent [19]

Bettini et al.

[11] Patent Number: 4,496,949
[45] Date of Patent: Jan. 29, 1985

[54] MTI RADAR ADAPTABLE TO DIFFERENT ENVIRONMENTAL CONDITIONS

[75] Inventors: Giuliano Bettini, Rome; Luigi Penso, Latina; Giuseppe Rodriguez, Rome, all of Italy

[73] Assignee: Selenia, Industrie Elettroniche Associate, S.p.A., Rome, Italy

[21] Appl. No.: 281,479

[22] Filed: Jul. 8, 1981

[30] Foreign Application Priority Data

Jul. 16, 1980 [IT] Italy ................ 49251 A/80

[51] Int. Cl.$^3$ ............................................. G01S 13/52
[52] U.S. Cl. .............................. 343/7.7; 343/17.7 R; 343/18 E
[58] Field of Search ................. 343/18 E, 7 A, 17.2 R, 343/7.7

[56] References Cited

U.S. PATENT DOCUMENTS

| | | | |
|---|---|---|---|
| 3,716,859 | 2/1973 | Webb et al. ........................... | 343/7.7 |
| 3,725,926 | 4/1973 | Ares ....................................... | 343/17.2 R |
| 4,038,659 | 7/1977 | Hamer et al. ........................ | 343/17.2 R X |
| 4,339,604 | 7/1982 | Petitjean ............................... | 343/17.2 R |
| 4,339,754 | 7/1982 | Hammers et al. ................... | 343/7 A X |

OTHER PUBLICATIONS

Paul W. Howells, "Explorations in Fixed and Adaptive Resolution at GE and SURC", IEE Transactions on Antennas and Propagation, vol. Ap-24, No. 5, Sep. 1976, pp. 575-584.

Primary Examiner—T. H. Tubbesing
Assistant Examiner—K. R. Kaiser
Attorney, Agent, or Firm—Karl F. Ross; Herbert Dubno

[57] ABSTRACT

A radar of the MTI type has a transmitter connected to a source of outgoing pulses whose carrier frequency is variable under the control of a mode selector for selective operation with fixed frequency, frequency diversity or frequency agility, depending on detected environmental conditions. A multiweight Doppler filter serves for the detection of mobile targets in each of these three modes. With frequency-agility operation, samples of echoes of an outgoing pulse received during a given sweep are stored in a memory in accordance with the carrier frequency used for that pulse, this frequency changing in random fashion from one pulse to the next among a certain number of predetermined values. A timer selecting the outgoing frequency also controls a multiplexer which during each sweep delivers to the Doppler filter up to m correlated samples of the same frequency stored in the memory during the last n sweeps, with n>m determined by the width of the antenna beam to ensure that the samples concurrently evaluated by the filter come from the same target.

4 Claims, 5 Drawing Figures

MTI RADAR ADAPTABLE TO DIFFERENT ENVIRONMENTAL CONDITIONS

FIELD OF THE INVENTION

Our present invention relates to a radar of the moving-target-indicator (MTI) type designed to operate with Doppler filtering under electronic-countermeasure (ECM) conditions.

BACKGROUND OF THE INVENTION

The use of Doppler filtering for the elimination of echoes from stationary reflectors is well known in MTI-type radars. Such filtering requires the emission of outgoing pulses of identical carrier frequency by the radar antenna during successive range sweeps occurring while the antenna beam scans an outlying object, the number of those sweeps being therefore determined by the effective width of the radar beam generally defined by the −3 dB limits. Thus, the separation of clutter from moving targets is easy as long as the radar operates with a fixed carrier frequency.

In the presence of hostile ECM, however, fixed-frequency operation is susceptible to interference from unfriendly sources. Such interference is also not safely eliminated by so-called frequency diversity in which a predetermined number of carrier frequencies are recurrently used in a certain pattern, as with emission of a first burst (i.e. a succession of a certain number of sweeps) of one frequency followed by a second burst of another frequency, and so on. In such a case the filtering is carried out with echoes from pulses of the same burst.

A third technique, known as frequency agility, involves a random switching from one carrier frequency to another in consecutive sweeps in order to prevent ECM locking onto the frequency used. This mode of operation, while providing maximum safety from interference, is, however, incompatible with Doppler filtering as conventionally practiced.

OBJECTS OF THE INVENTION

An important object of our present invention, therefore, is to provide means in an MTI-type radar for enabling its operation with frequency agility and concurrent Doppler filtering for the cancellation of clutter echoes and simultaneous foiling of ECM.

Another object is to provide a radar of this description which under certain conditions, as in the presence of a great deal of environmental clutter and when no electronic counter-counter-measures (ECCM) are required, can be conveniently switched over to the simpler fixed-frequency mode.

SUMMARY OF THE INVENTION

In common with conventional radars operating with frequency agility, our improved radar has antenna means for the emission of outgoing pulses of different carrier frequencies on a radar beam of predetermined effective width (as discussed above) and for the reception of echoes thereof reflected by outlying targets during a range sweep initiated by an outgoing pulse, frequency-generating and pulse-forming means provided with a timer operable to randomly select any one of a predetermined number of available carrier frequencies for emission at any sweep, transmitting means inserted between the pulse-forming means and the antenna means, receiving means connected to the antenna means, and gating means controlled by the timer for sampling incoming echoes. With n being the number of outgoing pulses (and thus of sweeps) accommodated within the width of the radar beam, the number j of available carrier frequencies is less than n whereby at least some carrier frequencies must randomly recur during any scan of a target (which might be a stationary object or element of clutter), with no carrier frequency occurring more than $m < n$ times during n successive sweeps. Echoes incoming during each sweep are sampled by the gating means and their samples are stored for n consecutive sweeps in memory means, connected to the gating means, at locations whose relationship with the respective carrier frequency used in such sweep is memorized by the timer; phase coherence of each carrier frequency is maintained by the frequency-generating means for at least these n sweeps. The timer controls multiplexer means connected to the memory means for concurrently reading out, in the course of each sweep, up to m correlated samples of echoes of identical carrier frequency stored during n preceding sweeps and feeding them to m-weight Doppler-filter means for evaluation to distinguish moving targets from clutter.

Another feature of our invention resides in the provision of mode-selecting means connected to the timer for switching from random frequency selection to operation with the same carrier frequency over a succession of sweeps in response to high-clutter environmental conditions, as noted above, especially when there is little need for ECCM action.

BRIEF DESCRIPTION OF THE DRAWING

The above and other features of our invention will now be described in detail with reference to the accompanying drawing in which.

SPECIFIC DESCRIPTION

Figure 1:
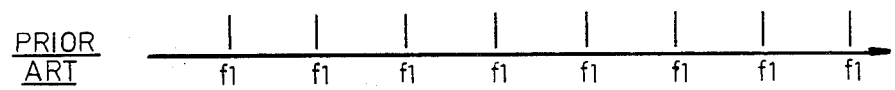
FIGS. 1, 2 and 3 are graphs respectively illustrating the fixed-frequency, frequency-diversity and frequency-agility modes of radar operation.

FIG. 1 shows a succession of outgoing radar pulses of identical carrier frequency $f_1$. As explained above, such a system permits easy Doppler filtering for the cancellation of clutter echoes but is highly susceptible to ECM interference.

Figure 2:
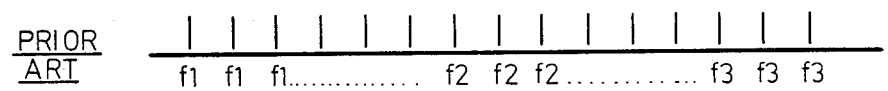

FIG. 2 illustrates the frequency-diversity mode already described according to which successive bursts of a number of pulses of carrier frequencies $f_1$, $f_2$, $f_3$ etc. are emitted. Doppler filtering is here limited to the pulses of like frequency sent out in a given burst.

Figure 3:
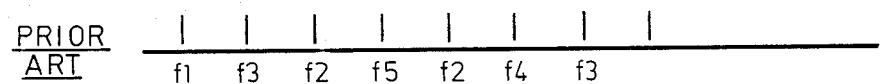

FIG. 3 is a representation of frequency agility as conventionally employed. With $j = 5$ frequencies $f_1$–$f_5$ assumed to be available, these frequencies occur in random fashion over a succession of outgoing radar pulses; their lack of mutual correlation prevents the utilization of Doppler filtering.

Figure 4:
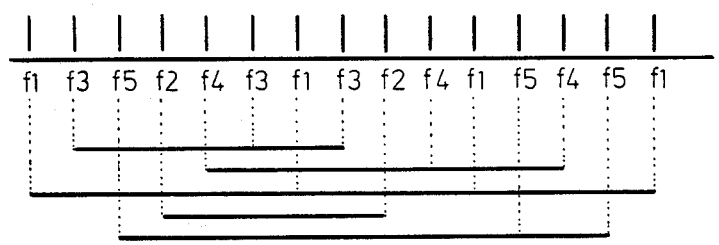
FIG. 4 is a similar graph illustrating our improved frequency-agility mode of operation.

FIG. 4 shows a modification of the frequency sequence of FIG. 3 to facilitate Doppler filtering in accordance with our invention, namely a series of $n = 15$ outgoing pulses, with random variation of carrier frequency from one pulse to the next. In the example given, carrier frequency $f_1$ occurs four times, frequency $f_2$ is encountered twice and the three other frequencies are each used three times. If a target is scanned in the course of this 15-pulse series, therefore, four correlated echoes of frequency $f_1$ are available for Doppler filtering along with a lesser number of echoes of other frequencies.

Figure 5:
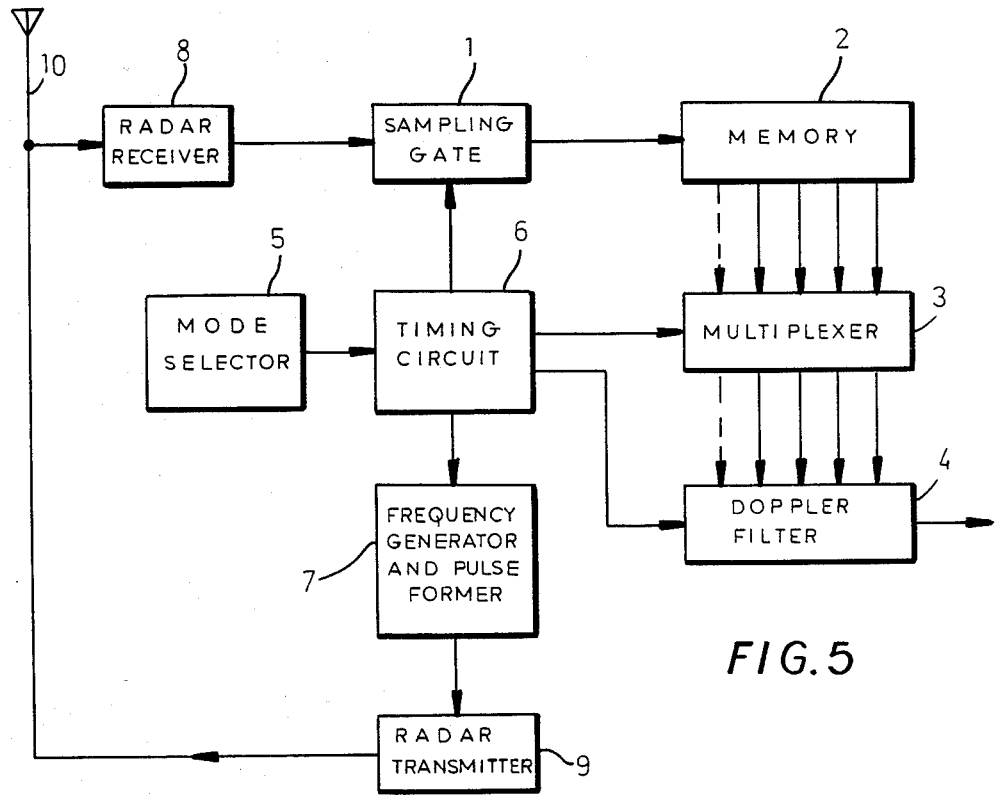
FIG. 5 is a block diagram of components of an MTI radar embodying our invention, designed to operate according to the mode of FIG. 4.

Reference will now be made to FIG. 5 which shows the usual radar antenna 10 emitting outgoing pulses from a transmitter 9 and feeding incoming echoes to a receiver 8. This receiver, through a sampling gate 1 controlled by a timing circuit 6, delivers the resulting samples to a memory 2 for storage over 15 pulse cycles under the conditions assumed with reference to FIG. 4. These frequencies $f_1$–$f_5$ are randomly selected under the control of timer 6 by a frequency generator and pulse former 7 which supplies them to transmitter 9. The stored samples can be read out via a multiplexer 3 which, advantageously, is set by the timer in conformity with the carrier frequency of a pulse sent out during a current sweep so that this setting changes from sweep to sweep.

If, say, the frequency randomly select by timer 6 for the pulse immediately following the sequence of FIG. 4 is again $f_1$, timer 6 controls multiplexer 3 to pass the four previously stored samples of echoes of the same frequency to an m-weight Doppler filter 4, with m=5 in this instance as indicated by five connections leading from memory 2 via multiplexer 3 to filter 4. The dotting of the fifth connection symbolizes the fact that, with the frequency distribution of FIG. 4, only four echoes are being transferred; in no event can more than m=5 echoes be so transferred at one and the same time in the embodiment of FIGS. 4 and 5. When activated by the timer, filter 4 operates in the known manner to cancel echoes from fixed objects while delivering those from moving targets to the nonillustrated, conventional downstream components of the radar.

For the proper control of multiplexer 3 it is merely necessary that the timer 6, besides knowing the locations of memory 2 at which the echoes of the preceding 15 pulses have been stored, memorize the carrier frequencies of the 15 outgoing pulses which have given rise to those echoes. Storage facilities usable for this purpose are, of course, state of the art.

Also shown in FIG. 5 is a mode selector 5 which, from an analysis of the environment, determines whether a high incidence of clutter and absence of ECM activity justifies a switchover to fixed-frequency operation. When conditions are right, a connection from selector 5 to timer 6 enables such switchover to be made; the timer then directs the frequency generator 7 to supply an invariable carrier frequency (e.g. $f_1$) to radar transmitter 9.

We claim:
1. In a radar having antenna means for the emission of outgoing pulses of different carrier frequencies on a radar beam of predetermined effective width and for the reception of echoes thereof reflected by outlying targets during a range sweep initiated by any outgoing pulse, frequency-generating and pulse-forming means provided with a timer operable to randomly select any one of a predetermined number of available carrier frequencies for emission at any sweep, transmitting means inserted between said pulse-forming means and said antenna means, receiving means connected to said antenna means, and gating means controlled by the timer for sampling incoming echoes, the combination therewith of:
memory means connected to said gating means for storing samples of echoes incoming during each sweep for n consecutive sweeps at locations whose relationship with the carrier frequencies of the respective echoes is memorized by said timer, the number j of available carrier frequencies being less than the number n of outgoing pulses accommodated within the width of the radar beam whereby at least some carrier frequencies randomly recur during any scan of a target, with no carrier frequency occurring more than m<n times during n successive sweeps, said frequency-generating means maintaining phase coherence of each carrier frequency for at least said n sweeps;

multiplexer means connected to said memory means and controlled by said timer for concurrently reading out, in the course of each sweep, up to m correlated samples of echoes of identical carrier frequency stored during n preceding sweeps; and m-weight Doppler-filter means connected to said multiplexer means for evaluating the correlated samples concurrently read out from said memory means to distinguish moving targets from clutter.

2. The combination defined in claim 1 wherein said timer controls said multiplexer means to connect said Doppler-filter means during any sweep to locations of said memory means storing m<n samples of echoes received with the carrier frequency utilized during the respective sweep.

3. The combination defined in claim 1, further comprising mode-selecting means connected to said timer for switching from random frequency selection to operation with the same carrier frequency over a succession of sweeps in response to high-clutter environmental conditions.

4. The combination defined in claim 1 wherein n=15 and j=5.

* * * * *